Feb. 21, 1933. E. G. BRIDGES 1,898,289
GLASS GATHERING TANK
Filed Aug. 14, 1929 2 Sheets-Sheet 1

Inventor
Edward G. Bridges
Attorney

Feb. 21, 1933.                    E. G. BRIDGES                       1,898,289
                                GLASS GATHERING TANK
                    Filed Aug. 14, 1929            2 Sheets-Sheet 2
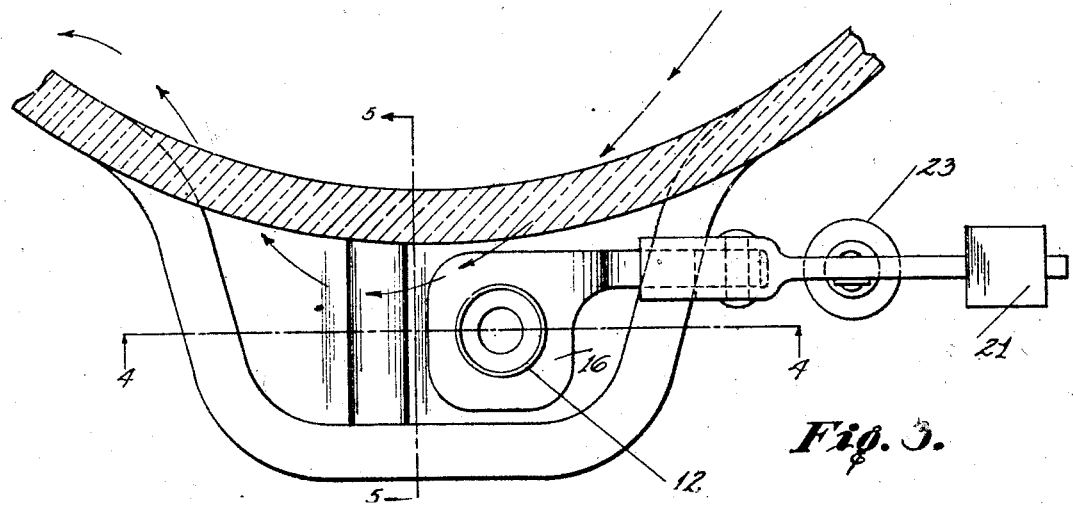
*Fig. 3.*
*Fig. 5.*           *Fig. 4.*
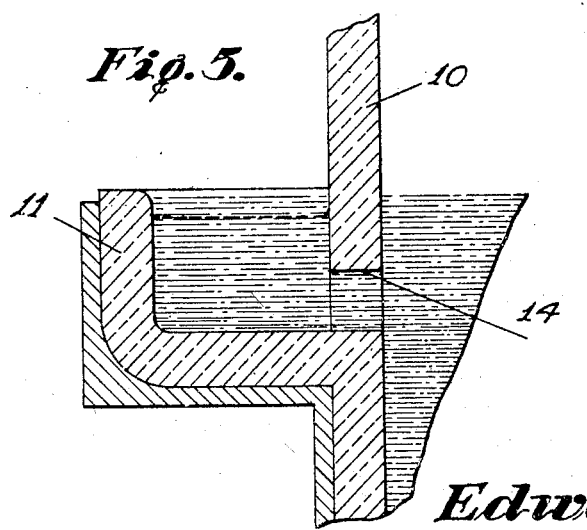
Inventor
Edward G. Bridges Patented Feb. 21, 1933

1,898,289

UNITED STATES PATENT OFFICE

EDWARD G. BRIDGES, OF ANDERSON, INDIANA, ASSIGNOR TO LYNCH CORPORATION, A CORPORATION OF INDIANA

GLASS GATHERING TANK

Application filed August 14, 1929. Serial No. 385,846.

The present invention relates to improved apparatus for gathering molten glass from gathering hearths supplied with glass from a glass heating tank or furnace, and aims generally to improve the operation of such apparatus.

One of the principal advantages of the invention is in the provision for maintaining a continuous and natural circulation of glass from the tank independently through each of a series of gathering hearths connected therewith and in periodically raising the level of the glass in the hearth to bring it into contact with the bottom of the gathering device or gathering mold of a glassware forming machine.

For an understanding of one manner of practicing the invention and one illustrative embodiment of the apparatus, reference may be had to the following detailed description and to the accompanying drawings, wherein Fig. 1 is a plan view of a portion of the tank illustrating a plurality of gathering hearths supplied with glass from a single tank;

Fig. 3 is a plan view of one of the gathering hearths;

Fig. 4 is a sectional view on the line 4—4 of Fig. 3; and

Fig. 5 is a sectional view on the line 5—5 of Fig. 3.

Figure 1:
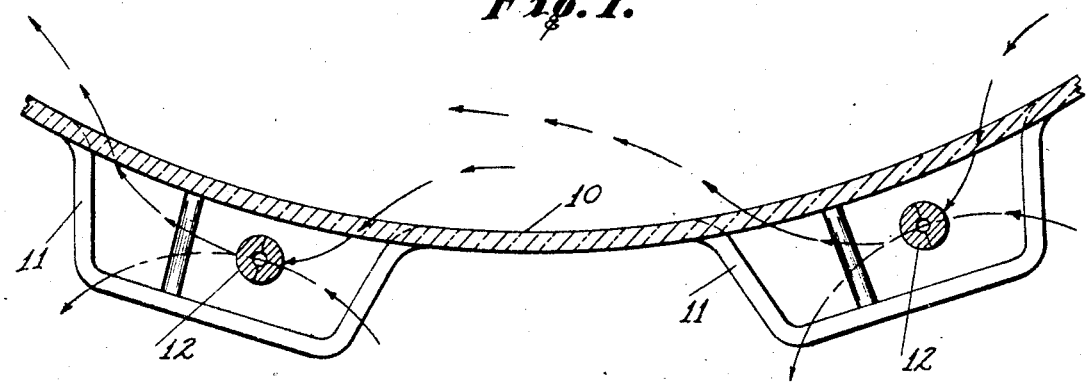

Briefly stated my invention consists in the provision of one or more gathering hearths connected to and extending laterally from a glass supply tank or furnace, and in circulating the glass from the tank through a submerged inlet into the hearth and returning the molten glass from the hearth to the tank at the glass level therein; and in periodically raising the body of glass, or a substantial portion thereof, in the hearth so as to bring it into a plane of contact with a gathering mold or device which may be continuously or intermittently movable in a fixed horizontal plane at a predetermined level above the normal glass level in the hearth.

In the illustrated embodiment, the tank 10 containing the supply of molten glass may be of any conventional construction and is provided with a series of open-topped gathering hearths or pots 11 arranged at spaced intervals circumferentially around the tank 10 and projecting laterally beyond the wall of the tank so that the glass in the hearth will be accessible to the suction gathering molds 12 of the rotatable glass working machine 13 which may be of any suitable type.

The side walls of the hearth preferably extend from the tank wall at an obtuse angle so as not to interfere with the natural circulation of glass set up in the tank and circulating through the hearths.

A continuous supply of molten glass is provided for each gathering hearth 11 from within the tank 10 at a level substantially below the glass level in the tank, advantageously by means of a submerged passageway 14 in the wall of the tank 10 leading into the hearth so that the glass supplied to the hearth from the tank will be selected from the hotter portion of the glass in the tank and the presence of stones, scum, or chilled glass in the hearth will be prevented.

The hearth is advantageously a continuous elongated open-topped receptacle, the glass being supplied thereto adjacent one end thereof and provision is made in the wall of the tank 10 adjacent the other end of the hearth for the return of the cooler glass into the tank for reheating, as by means of a passageway 15 in the tank wall at substantially the glass level as indicated in Fig. 4. The presence of a number of glass working machines withdrawing glass from the successive gathering hearths creates a substantial circulation of glass within the tank and by controlling the circulation of the glass from the tank independently through each hearth through a submerged inlet and a surface outlet, the glass in the hearth available for the glass working machine is maintained at a very uniform temperature and substantially free from stones, hot or chilled spots such as may tend to produce defective ware.

Heretofore it has been the practice in gathering glass from open-topped supply hearths to move a series of gathering devices or molds successively into position over the hearth, and to lower the gathering device or molds into contact therewith so that suction supplied in the gathering devices or mold may fill the mold with glass. It has also been proposed to intermittently raise a relatively small column of glass into contact with a mold movable in a predetermined level but such devices as I am aware of have been unsuccessful as they do not provide means for recirculating that portion of the column which is sheared from the successive mold charges and which necessarily is of a much lower temperature than the remaining glass in the hearth so that a uniform temperature of glass for the supply of mold charges cannot be maintained.

My improved method contemplates the raising of substantially the entire body of glass in the gathering hearth so that the upper surface thereof will approach the plane of a moving mold from which the mold charges may be gathered by means of suction applied within the mold as is well understood in the art. One practical manner of carrying into practice my improved method is to provide a member vertically movable throughout a substantial portion of the glass in the hearth, and in the embodiment of the invention illustrated in the drawings this movable member may take the form of a paddle 16 of a refractory material detachably connected, as at 17, to an arm 18 pivoted at 19 to a support or bracket 20. The weight of the member 16 is preferably counterbalanced by a weight 21 adjustable with the arm 18 and suitable means, as for instance, a piston 22 working in a fluid pressure cylinder 23 is provided for reciprocating the arm to effect a vertical movement of the paddle. Advantageously the paddle may be slightly cup-shaped so as to effect the lifting of a more substantial body of the glass in the hearth and in raising the level thereof as indicated in dotted lines, Fig. 4, at 24, into contact with the bottom of a gathering mold 12.

The gathering devices 12 may be of any form of construction suitable for the type of ware to be made on the glass working machine but in the embodiment illustrated, the molds are of a type suitable for the manufacture of hollow glass containers and as illustrated, comprise divided parison molds mounted on carriers 25 and cooperating divided neck molds mounted on carriers 26 carried by arms 27 on a rotatable member 28, the arm 27 and molds being movable in a uniformly continuous path in a horizontal plane at a predetermined level above the open top of the hearth.

The glassware forming machine may advantageously be provided with suitable connections as at 29 and 30 for opening and closing the parison molds and neck molds and, as is well understood in the art, in the manufacture of narrow neck containers the parison molds are closed around the neck rings during the gathering of the mold charges and are opened during movement thereof and after the formation of the parison to present the bare parison, supported by the neck molds, ready for transfer to a series of finishing molds 31 which may be automatically operated by connections 32 to close around the exposed parison, and in which the containers are blown to their finished form. The rotatable member 28 carrying the series of molds is preferably continuously rotatable around its vertical axis.

In order that the level of the glass in the forehearth shall be raised at the proper time, as the gathering device is positioned or moves into position over the gathering hearth, the operating mechanism 22 and 23 for the paddle 16 is actuated in synchronism with the movement of the mold carrier, and in the present instance the fluid pressure operated mechanism for the lever 18 is advantageously controlled by means of a valve 33 operated by the carrier turning mechanism 34. Thus, as the mold or other gathering device approaches the gathering position over the hearth, the lever 18 is operated to lift the paddle 16 vertically, thus raising the body of glass in the hearth to the level of the mold.

Figure 2:
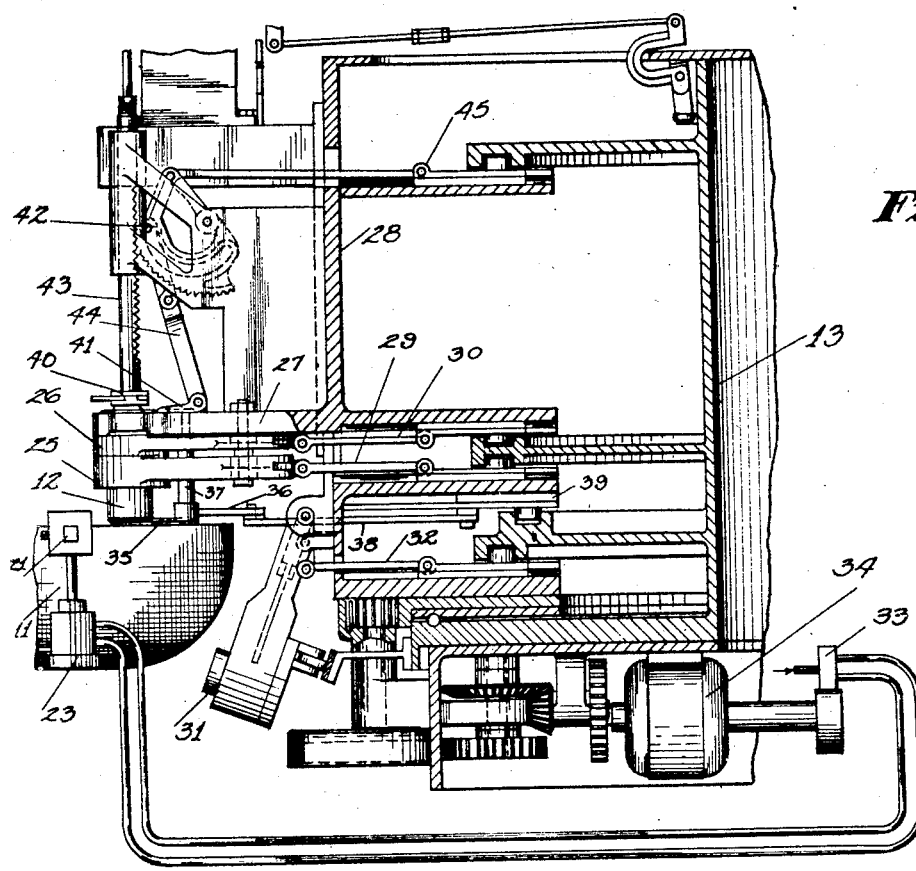
Fig. 2 is a fragmental side elevation illustrating diagrammatically a portion of the glassware forming machine in a hearth in position to gather glass from it.

The glass in the forehearth may be severed from that in the filled mold by suitable swinging knives or shears 35, respectively carried on levers 36 pivoted on studs 37 depending from the arms 27, and actuated in any convenient manner as by means of the links 38 connected to cam operated slides 39, as illustrated in Fig. 2, as is common in this type of machine.

Means for lifting and lowering the suction head 40 and sliding the blowhead 41 into and out of cooperative relation to the mold at the proper times are also provided, as is well understood in the art, that illustrated comprising a gear sector 42 having teeth engaging a rack on the suction head spindle 43 and a cam groove for actuating the blowhead slide by means of a pivoted lever 44, the gear sector being oscillated periodically by a link and cam slide 45 similarly to the other operating parts of the machine.

Advantages of the invention reside in the accurate and simplified control for raising the glass in the hearth to the mold level while at the same time permitting of the continuous circulation of the glass in the hearth into and out of the tank so that the glass supplied to the gathering point in the hearth is always at substantially the same uniform temperature and consistency.

The improved method and apparatus removes the necessity of expensive, heavy and cumbersome mechanism commonly used for effecting dipping or raising of the gathering molds, thus permitting of lighter and more simply constructed glass working machines.

My invention is not to be restricted to the particular mechanism and details illustrated in the accompanying drawings, nor to the use of the method in combination with a continuously rotating forming machine of the type described, as obviously the use of other types of glass working machines, whether continuously or intermittently movable, is within the scope of my invention.

I claim:

1. Glass gathering apparatus comprising a gathering hearth in communication with a tank of molten glass through passages at its ends to permit circulation of glass into and out of the hearth, the passage at one end being below the level of the glass in the tank, a gathering device movable into cooperative charging relation in a predetermined plane above said hearth, means vertically movable in said hearth and below the level of the glass therein effective to lift an unconfined body of glass therein into contact with the bottom of the mold, and means for applying suction within said mold to fill it.

2. Glass gathering apparatus comprising an open-topped gathering hearth provided with passages at its ends communicating with a supply tank to permit circulation of glass into and out of the hearth, the passage at the supply end of said hearth being below the level of the glass in said tank, a gathering mold movable over said hearth in predetermined spaced relation to the normal level of glass therein, and means movable within said hearth and periodically operable to raise the level of an unconfined body of glass therein into charging contact with said mold.

3. Glass gathering apparatus comprising a gathering hearth in communication with a tank of molten glass through a submerged passage and a passage at the level of the glass in the tank, a gathering device movable into cooperative charging relation in a predetermined plane above said hearth, means operative in said hearth effective to raise the level of an unconfined body of glass therein into contact with the bottom of the mold, and means for applying suction within said mold to fill it.

4. Glass gathering apparatus comprising an open-topped gathering hearth provided with passages at its ends communicating with a supply tank to permit circulation of molten glass into and out of said hearth, the passage at the supply end of said hearth being below the level of the glass in said tank, and means movable within said hearth, and periodically operable to raise the level of an unconfined body of glass therein and thereby draw glass from said tank through said supply passage.

5. Glass gathering apparatus comprising an open-topped gathering hearth adapted to be supplied with molten glass from a supply tank, a submerged passage for said supply, a return passage at the level of the glass in said tank, a gathering mold movable into cooperative charging relation in a predetermined plane above the normal level of the glass in said hearth, and means normally submerged in the glass in said hearth to raise the level of an unconfined body of glass therein into charging contact with said mold, said submerged means being positioned between said submerged passage and return passage to draw glass from said tank through the former and return it through the latter.

6. Glass gathering apparatus comprising a tank containing a supply of molten glass, a gathering hearth therein and connecting therewith below the glass level in the tank, a vertically movable paddle submerged in the glass in the hearth near said supply connection to the tank, and a separate return passageway for the glass from an end of the hearth to the tank at the level of the glass in the tank, said return passage being adjacent said paddle member to receive the surplus chilled glass displaced by said member.

7. Glass gathering apparatus comprising a tank containing a supply of molten glass, an elongated open-topped gathering hearth providing an unobstructed receptacle from which charges of molten glass may be withdrawn, the wall of said tank having a submerged passage for the supply of molten glass thereto and a return passage from the hearth to the tank at substantially the level of glass therein, and means below the level of the glass for periodically raising the level of an unconfined and unseparated portion of the glass in said hearth at the gathering point.

8. The method of circulating and feeding molten glass in and from a tank and forehearth to a gathering mold of a glassware forming machine that comprises drawing the glass from a pool in the hearth, maintaining two passages between said tank and hearth, one below and the other at the normal level of glass therein, and periodically raising the level of an unconfined body of glass in the hearth into charging contact with said gathering mold, whereby circulation of glass into said hearth from the bottom of said tank and out of said hearth at the level of glass in said tank is produced.

9. The method of feeding and circulating glass in a pool that comprises lifting an unconfined body of glass into charging contact with the gathering device, thereby causing a flow of glass toward the surface of said pool from beneath to the feeding point, and gathering away surplus glass through a channel at the surface of said pool.

10. The method of feeding and circulating glass in a pool that comprises periodically lifting an unconfined body of glass at the feeding point larger than that required to supply the amount required for feeding, and simultaneously causing the surplus glass to flow laterally away from the feeding point on the surface of the pool and preventing its immediate return to the body of glass beneath the feeding point.

In testimony whereof, I have signed my name to this specification.

EDWARD G. BRIDGES.